(12) United States Patent
Bhatia et al.

(10) Patent No.: US 9,726,440 B2
(45) Date of Patent: Aug. 8, 2017

(54) CO-AXIAL VALVE APPARATUS

(71) Applicant: Dana Canada Corporation, Oakville (CA)

(72) Inventors: Sachin Bhatia, Mississauga (CA); Jeff Sheppard, Milton (CA); Joseph Kamenski, Hamilton (CA)

(73) Assignee: Dana Canada Corporation, Oakville, Ontario (CA)

( * ) Notice: Subject to any disclaimer, the term of this patent is extended or adjusted under 35 U.S.C. 154(b) by 146 days.

(21) Appl. No.: 14/554,841

(22) Filed: Nov. 26, 2014

(65) Prior Publication Data

US 2016/0146554 A1      May 26, 2016

Related U.S. Application Data

(60) Provisional application No. 61/910,082, filed on Nov. 28, 2013.

(51) Int. Cl.
| | |
|---|---|
| G05D 23/00 | (2006.01) |
| F28F 9/22 | (2006.01) |
| F16K 11/07 | (2006.01) |
| F16K 31/00 | (2006.01) |
| F28F 27/02 | (2006.01) |
| F28D 9/00 | (2006.01) |

(Continued)

(52) U.S. Cl.
CPC ............ *F28F 9/22* (2013.01); *F16K 11/0655* (2013.01); *F16K 11/0716* (2013.01); *F16K 27/044* (2013.01); *F16K 31/002* (2013.01); *F28D 9/005* (2013.01); *F28F 27/02* (2013.01); *F28D 2021/008* (2013.01)

(58) Field of Classification Search
CPC .... F28F 9/22; F28F 27/02; F28F 27/00; F28F 2250/06; F16K 11/0655; F16K 11/0716; F16K 27/044; F16K 31/002; F28D 9/005; F28D 2021/008; F28D 2021/0089
USPC ................. 165/100, 96, 287, 297; 251/237; 137/468, 540, 543.15, 543.17
See application file for complete search history.

(56) References Cited

U.S. PATENT DOCUMENTS 2,540,629 A * 2/1951 Miller .................... F01M 5/007
                                                         165/280
2,809,810 A    10/1957 Carroll, Jr. et al.
(Continued)

FOREIGN PATENT DOCUMENTS

| DE | 10051492 A1 | 4/2002 |
|---|---|---|
| DE | 20304726 U1 | 6/2003 |

*Primary Examiner* — Justin Jonaitis
(74) *Attorney, Agent, or Firm* — Marshall & Melhorn, LLC

(57) ABSTRACT

A valve apparatus having a co-axial fluid inlet and outlet is disclosed. The valve apparatus comprises a housing having a generally tapering main cavity. The valve apparatus further comprises a first fluid inlet formed therein for receiving fluid from a source, a first fluid outlet for returning the fluid to the source, a second fluid outlet for discharging fluid from the housing and a second fluid inlet for receiving fluid and returning the fluid to the fluid source. A valve mechanism is slidingly mounted within a first valve chamber for controlling flow from the first fluid inlet to the second fluid outlet, the valve mechanism having a first position wherein a second valve chamber is in communication with the first valve chamber and the first fluid outlet, and a second position wherein a third valve chamber is in fluid communication with the first valve chamber and the second fluid outlet.

20 Claims, 10 Drawing Sheets

(51) Int. Cl.
   *F16K 11/065*   (2006.01)
   *F16K 27/04*    (2006.01)
   F28D 21/00      (2006.01)

(56) References Cited

U.S. PATENT DOCUMENTS

| | | |
|---|---|---|
| 3,353,590 A | 11/1967 | Holman |
| 3,420,293 A | 1/1969 | Campbell |
| 3,506,192 A | 4/1970 | Otto |
| 3,695,293 A * | 10/1972 | Zeuner ................ F16K 11/10 137/625.48 |
| 4,398,662 A | 8/1983 | Costello |
| 4,440,191 A * | 4/1984 | Hansen ................ F02C 9/263 137/468 |
| 4,993,479 A | 2/1991 | Jekerle |
| 5,242,011 A | 9/1993 | Hesse |
| 5,988,514 A | 11/1999 | Huang |
| 7,044,155 B2 | 5/2006 | Zanolin et al. |
| 8,066,198 B2 | 11/2011 | Palanchon et al. |
| 8,602,056 B2 | 12/2013 | Schutz |
| 9,500,191 B2 * | 11/2016 | Scarpinato ........... F04B 39/02 |
| 2013/0160972 A1 * | 6/2013 | Sheppard ............. F28F 27/00 165/96 |

* cited by examiner

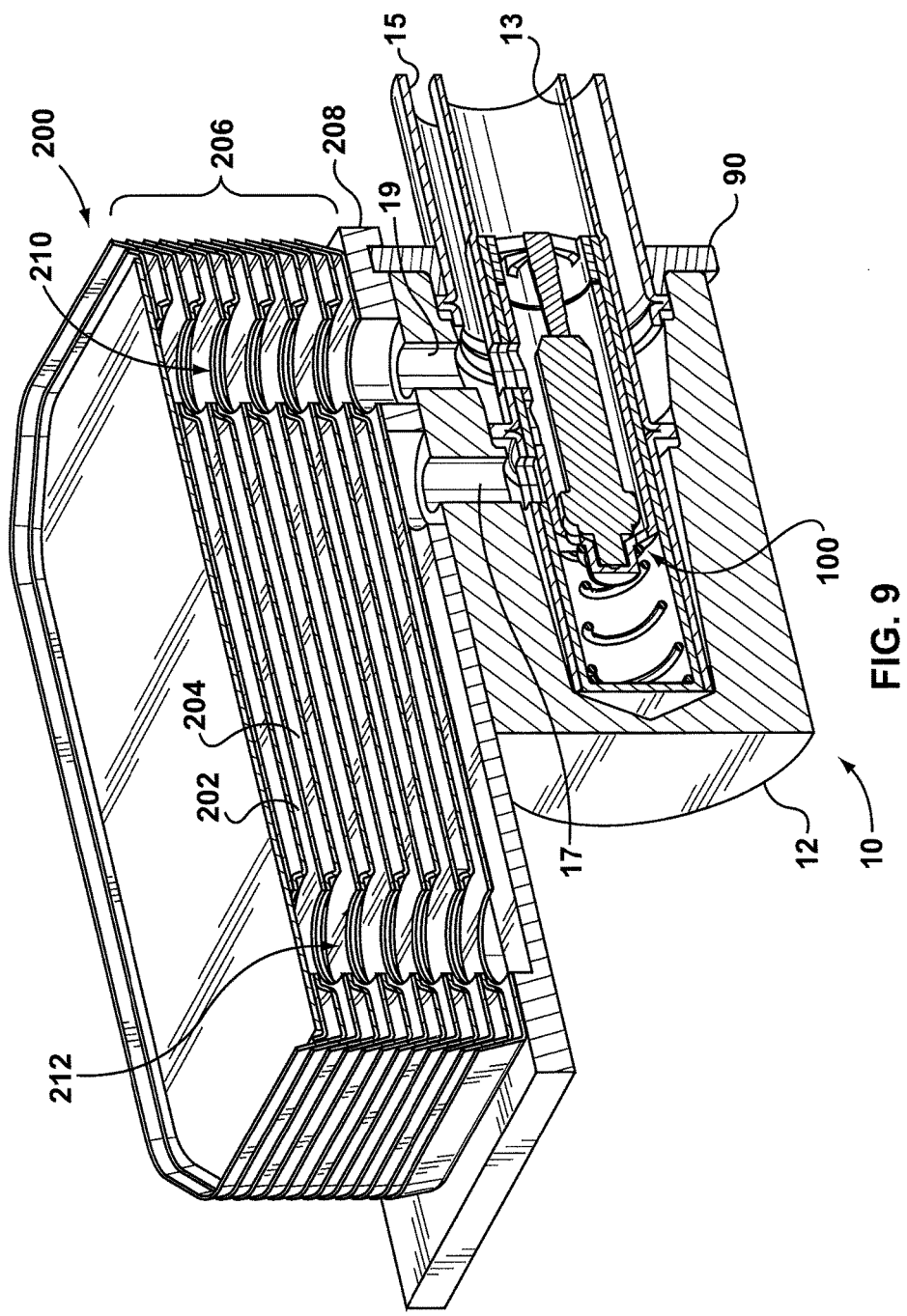

CO-AXIAL VALVE APPARATUS

CROSS-REFERENCE TO RELATED APPLICATION

This application claims priority to and the benefit of U.S. Provisional Patent Application No. 61/910,082, filed Nov. 28, 2013 under the title CO-AXIAL VALVE APPARATUS. The content of the above patent application is hereby expressly incorporated by reference into the detailed description of the present application.

TECHNICAL FIELD

The specification relates to a valve apparatus, in particular a co-axial valve apparatus where fluid entering and exiting the valve mechanism flows along a common axis, the valve apparatus being configured for either direct or remote-mounting to a heat exchanger forming a heat exchanger and valve apparatus assembly.

BACKGROUND

The use of valves to control the flow of a fluid within an overall heat exchange circuit within an automobile system is known. Control valves or thermal bypass valves (TBV) are often used in combination with heat exchangers to either direct a fluid to a corresponding heat exchanger for heating/cooling or to direct the fluid elsewhere in the heat exchange circuit so as to bypass the heat exchanger. Control valves or thermal bypass valves are also often used in automobile systems to sense the temperature of a particular fluid so as to either direct it to an appropriate heat exchanger in order to assist with either (i) maintaining an automobile system fluid within an optimal temperature range or (ii) bringing the temperature of the automobile fluid to within the optimal operating range.

Often, control valves or thermal bypass valves are incorporated into a heat exchange system by way of external fluid lines that are, in turn, connected to an inlet/outlet of a heat exchanger, the control valves being separate to the heat exchanger and being connected either upstream or downstream from the heat exchanger within the external fluid lines. Control valves or thermal bypass valves are also sometimes required to be directly mounted to or integrated with a specific component of the overall automobile system often requiring different fluid connections that enable direct mounting to the housing of a particular component or heat exchanger. This not only adds to the overall costs associated with the system, but also gives rise to multiple potential points of failure and/or leakage.

Accordingly, there is a need for improved valve units as well as heat exchanger assemblies incorporating valve units that are adaptable to various mounting arrangements, such as direct or remote-mounting to a fluid source and/or direct or remote-mounting to a heat exchanger, in order to satisfy various system requirements and/or different space allocation requirements within an engine compartment of an automobile.

SUMMARY OF THE PRESENT DISCLOSURE

In accordance with an exemplary embodiment of the present disclosure there is provided a valve apparatus comprising a valve housing; a main cavity formed within said valve housing and extending from a first open end having a first diameter to a second closed end having a second reduced diameter, the second closed end being embedded within said valve housing; a first fluid inlet passage for receiving fluid from a fluid source in a first direction; a first fluid outlet passage for returning said fluid to said fluid source in a second direction that is generally opposite to said first direction; a second fluid outlet for discharging said fluid from said valve housing; a second fluid inlet for receiving said discharged fluid returning said to said fluid source via said first fluid outlet; a first valve chamber formed within said main cavity and in communication with said first fluid inlet; a valve mechanism slidingly mounted within said first valve chamber, the valve mechanism adapted for controlling fluid flow from said first fluid inlet passage to said second fluid outlet; a second valve chamber in fluid communication with first valve chamber and said first fluid outlet passage when said valve mechanism is in a first position; a third valve chamber in fluid communication with said first valve chamber and said second fluid outlet when said valve mechanism is in a second position; wherein said second valve chamber is fluidly isolated from said third valve chamber; and wherein the first fluid inlet passage is arranged coaxially within said first fluid outlet passage.

In accordance with another exemplary embodiment of the present disclosure there is provided a heat exchanger assembly comprising a heat exchanger comprising a plurality of stacked heat exchange plates defining alternating first and second fluid passageways, a pair of first manifolds in fluid communication with the first passageways and a pair of second manifolds in fluid communication with the second passageways; and a valve apparatus comprising a valve housing having a main cavity formed therein and extending from a first open end having a first diameter to a second closed end having a second reduced diameter, the second closed end of the main cavity being embedded within the valve housing; a first fluid inlet passage for receiving fluid from a fluid source in a first direction; a first fluid outlet passage for returning the fluid to the fluid source in a second direction that is generally opposite to the first direction; a second fluid outlet for discharging the fluid from the valve housing to an inlet manifold of the heat exchanger; a second fluid inlet for receiving the fluid from an outlet manifold of the heat exchanger and returning the fluid to the fluid source via the first fluid outlet; a first valve chamber formed within the main cavity and in communication with the first fluid inlet; a valve mechanism slidingly mounted within the first valve chamber, the valve mechanism adapted for controlling fluid flow from the first fluid inlet passage to the second fluid outlet; a second valve chamber in fluid communication with first valve chamber and the first fluid outlet passage when the valve mechanism is in a first position; a third valve chamber in fluid communication with the first valve chamber and the second fluid outlet when the valve mechanism is in a second position; wherein the second valve chamber is fluidly isolated from the third valve chamber; and wherein the first fluid inlet passage is arranged coaxially within the first fluid outlet passage.

BRIEF DESCRIPTION OF THE DRAWINGS

Reference will now be made, by way of example, to the accompanying drawings which show example embodiments of the present application, and in which:

FIG. 9 is a perspective cross-sectional view of the heat exchanger assembly of FIG. 7.

Similar reference numerals may have been used in different figures to denote similar components.

DESCRIPTION OF EXAMPLE EMBODIMENTS

Reference will now be made in detail to exemplary implementations of the technology. The example embodiments are provided by way of explanation of the technology only and not as a limitation of the technology. It will be apparent to those skilled in the art that various modifications and variations can be made in the present technology. Thus, it is intended that the present technology cover such modifications and variations that come within the scope of the present technology.

Figure 1:
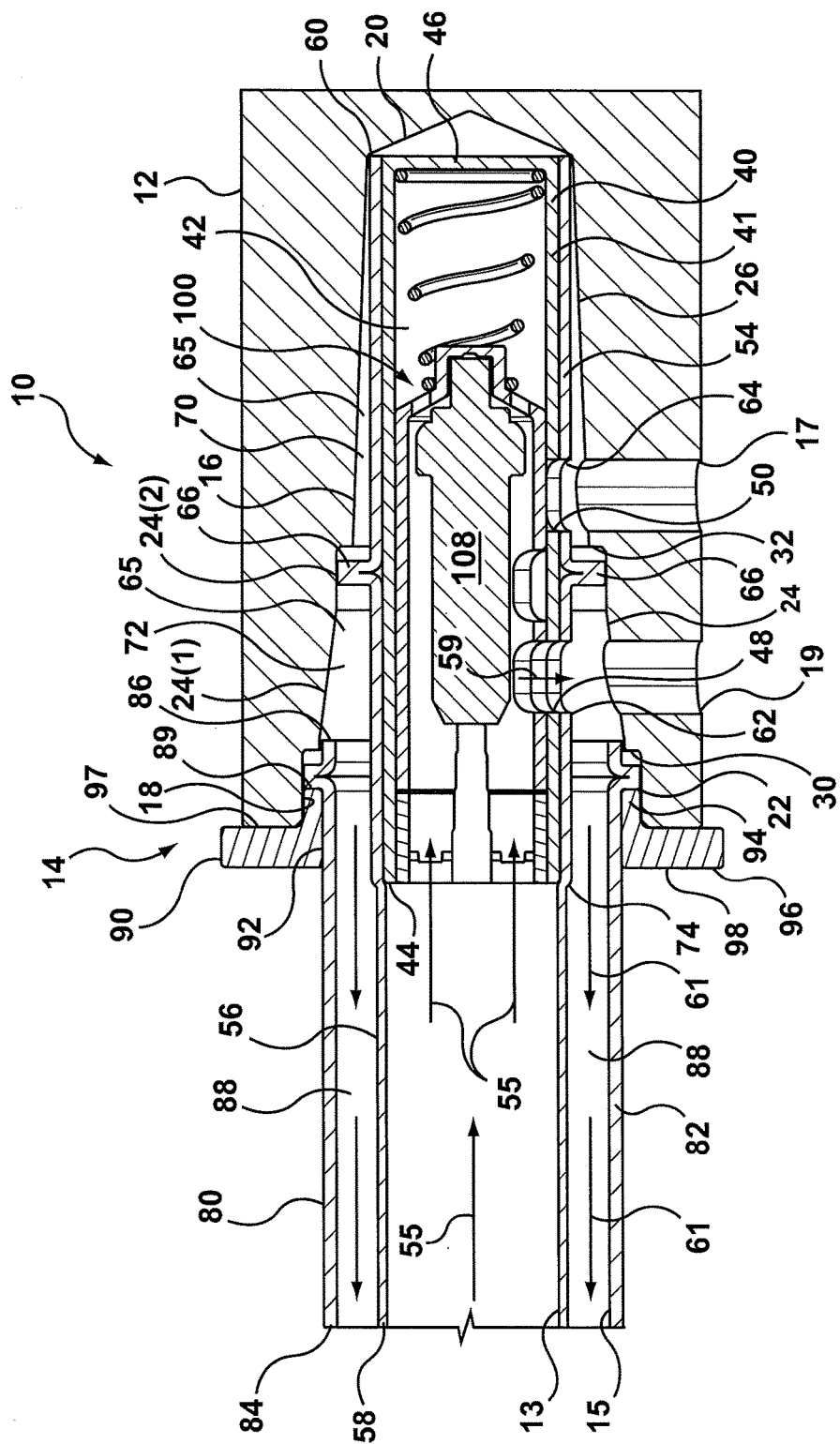
FIG. 1 is a cross-sectional view of an example embodiment of a valve apparatus according to the present disclosure in a first operational state.
Figure 2:
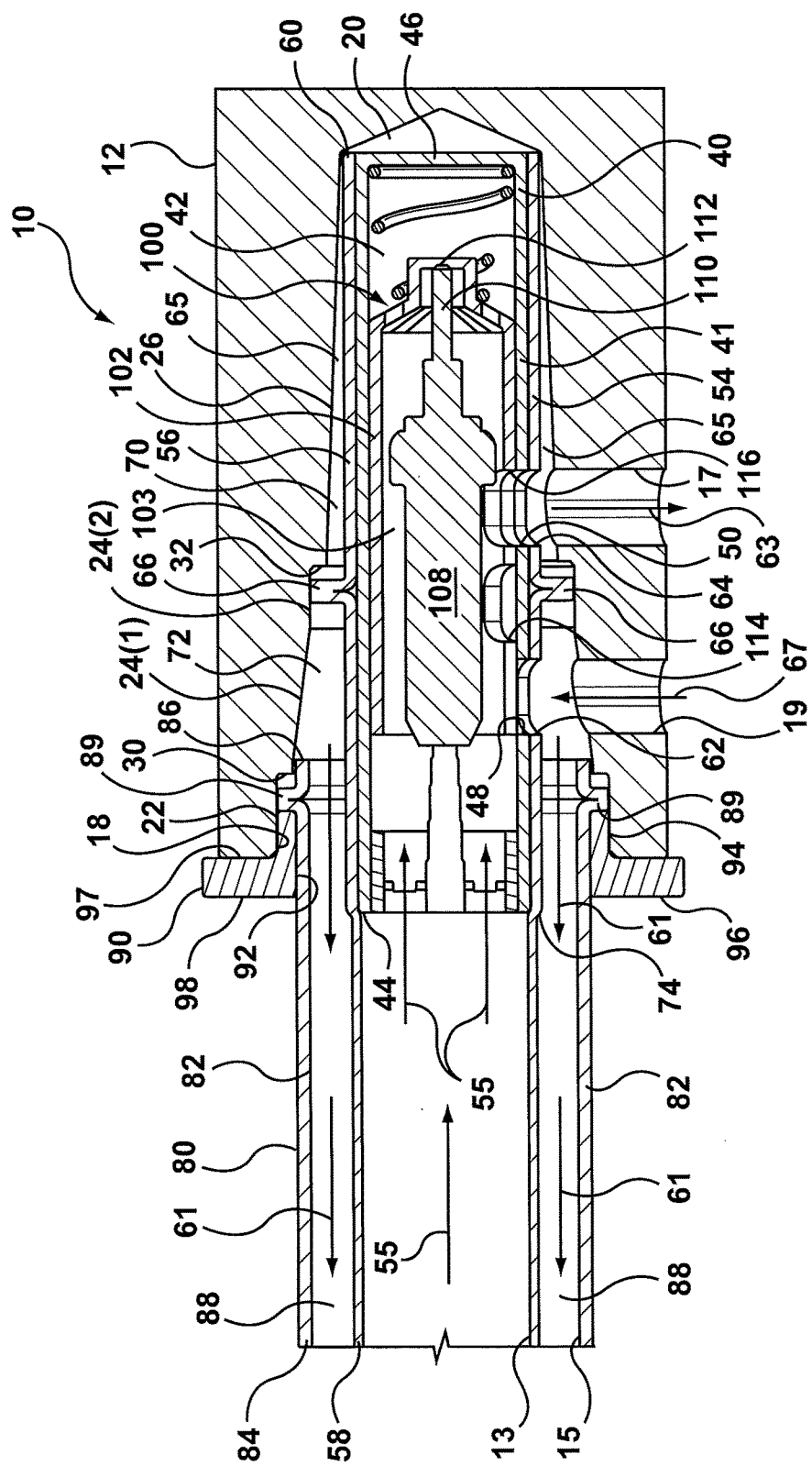
FIG. 2 is a cross-sectional view of the valve apparatus of FIG. 1 in a second operational state.

Referring now to FIGS. 1 and 2 there is shown an exemplary embodiment of a valve apparatus 10 according to the present disclosure. In the subject exemplary embodiment the valve apparatus 10 is intended to be mounted directly to a fluid source and in conjunction with a corresponding heat exchanger 200 (as shown for instance in FIGS. 7-9), the valve apparatus 10 serving to either direct fluid from the fluid source to the corresponding heat exchanger for cooling (or heating) or to direct fluid from the fluid source away from the heat exchanger. Accordingly, the valve apparatus defines both a first inlet passage 13 for receiving fluid from the fluid source in a first direction and a first outlet passage 15 for returning fluid to the fluid source, i.e. an automobile transmission or engine, in a second direction generally opposite to the first direction, the first inlet passage 13 and first outlet passage 15 being arranged co-axially along a generally central, longitudinal axis of the valve apparatus 10 so that flow through the first outlet passage 15 is arranged in counter-flow to the flow through the first inlet passage 13 as will be described in further detail below. The valve apparatus 10 further defines a second fluid outlet 17 for transferring the fluid entering the valve apparatus 10 from the fluid source to the corresponding heat exchanger 200 under certain operating conditions, and a second inlet 19 for receiving the fluid from the corresponding heat exchanger 200 and returning the fluid to the fluid source via the first outlet passage 15.

Valve apparatus 10 comprises a valve housing 12 which can have a generally rectangular or box-like shape, although the valve housing 12 may have other forms as well and is not necessarily limited to a generally rectangular or box-like shape. The valve apparatus 10 has a first end 14 adapted for mounting directly to the housing of an automobile system component (not shown) such as, but not limited to, a transmission housing or an engine housing, for example.

A main cavity 16 is formed within the valve housing 12, the main cavity 16 being generally cylindrical and having an open, first end 18 formed in the body of the valve housing 12 and a closed, second end 20 embedded within the body of the valve housing 12, the main cavity 16 being arranged along a generally central, longitudinal axis of the valve housing 12 and generally tapering from the first open end 18 to the closed second end 20. The tapering of the main cavity 16 from the first open end 18 to the second closed end 20 creates three distinct valve chamber regions 22, 24, 26 within the main cavity 16. The first region 22 extends from the first open end 18 in the valve housing 16 to a first peripheral edge 30 formed in the main cavity 12 at a constant diameter so as to define a generally circular opening having a depth corresponding to the length of the first region 22 along the longitudinal axis. The second region 24 extends from the first peripheral edge 30 to a second peripheral edge 32 formed within the main cavity 16, and has a first, tapering portion 24(1) and a second portion 24(2) that extends at a constant diameter terminating at the second peripheral edge 32. The third region 26 extends from the second peripheral edge 32 to the closed, second end 20 of the valve chamber 16 and generally tapering from a first diameter defined by the second peripheral edge 32 to a second diameter defined by the closed second end 20 of the main cavity 16. The second fluid outlet 17 formed in the valve housing 12 is arranged so as to be in fluid communication with the third region of the main cavity 16 while the second fluid inlet 19 is arranged so as to be in fluid communication with the second region 24 of the main cavity 16.

A first sleeve member 40 is mounted within the main cavity 16. The first sleeve member 40 is a generally cylindrical member having an outer wall 41 defining an open interior space 42 in the form of a first valve chamber, the sleeve member 40 having a first open end 44 and a second closed end 46. The first sleeve member 40 is mounted within the main cavity 16 so that the second, closed end 46 of the sleeve member 40 generally abuts or is arranged proximal to the closed, second end 20 of the main cavity 16 and with the first open end 44 arranged approximately in-line with or slightly exterior to the first open end 18 of the main cavity or valve housing 12. Accordingly, the first sleeve member 40 extends through the first, second and third regions 22, 24, 26 of the main cavity 16. First and second fluid openings 48, 50 are formed in the outer wall 41 of the first sleeve member 41, which openings 48, 50 are formed so as to correspond to and be axially aligned with the second fluid inlet and second fluid outlet openings 19, 17 of the valve housing 12.

A second sleeve member 54 is mounted exterior to the first sleeve member 40 in such a manner that the first sleeve member 40 is received within the second sleeve member 54. The second sleeve member 54 has a generally tubular or cylindrical form defined by an outer wall 56 that extends longitudinally between opposed open ends 58, 60. The second sleeve member 54 is sized so that the first sleeve member 40 fits tightly within the second sleeve member 54 with the outer surface of the outer wall 41 of the first sleeve member 40 being in direct contact with the inner surface of the outer wall 56 of the second sleeve member 54. The closed end 46 of the first sleeve member 40 is generally aligned with one of the open ends 60 of the second sleeve member 54, with the open end 60 of the second sleeve member 54 and the closed end of the first sleeve member 40 arranged proximal to or generally abutting the closed end 20 of the main cavity 16 formed in the valve housing 12. The opposed open end 58 of the second sleeve member 54 extends outwardly from the valve housing 12 and, effectively, defines the first fluid inlet passage 13 of the valve apparatus 10.

First and second fluid openings 62, 64 are formed in the outer wall 56 of the second sleeve member 54, which openings 62, 64 are formed so as to correspond to and be axially aligned with the second fluid inlet and second fluid outlet openings 19, 17 of the valve housing 12.

Since the second sleeve member 54 extends generally at a constant diameter along its length, when arranged within the main cavity 16 of the valve housing 12, a gap 65 is created between the outer wall 56 of the second sleeve 54 and the tapered inner surface of the wall forming the main cavity 16, the size of the gap 65 between the wall forming the main cavity 16 and the outer wall 56 of the second sleeve member 54 decreasing through the first, second and third regions 22, 24, 26 of the main cavity 16.

A outwardly extending peripheral flange or rib 66 is formed in the outer wall 56 of the second sleeve member 54 intermediate the first and second fluid openings 62, 64. Therefore, the outwardly extending peripheral flange or rib 66 is formed at a location so as to correspond to the second portion 24(2) of the second region 24 of the main cavity 16 with the outwardly extending peripheral flange or rib 66 abutting and sealing against the inner surface of the portion of the main cavity 16 having a constant diameter that forms the second portion 24(2) of the second region 24 of the main cavity 16. The outwardly extending peripheral flange or rib 66 therefore creates a fluid barrier between the gap 65 formed in the second region 24 and third regions 26 of the main cavity 16. Accordingly, a second fluid chamber 72 is formed between the outer wall 56 of the second sleeve member 54 and the wall forming the second region 24(1) of the main cavity 16 and a third fluid chamber 70 is formed between the outer wall 56 of the second sleeve member 54 and the wall forming the third region 26 of the main cavity, the second fluid chamber 72 being fluidly isolated from the third fluid chamber 70 by the outwardly extending peripheral flange or rib 66.

The second sleeve member 54 may also be formed with a slight indentation 74 in the outer wall 56 in order to slightly crimp down around the first open end of the first sleeve member 40 so as to prevent movement or displacement of the first sleeve member 40 along the central longitudinal axis of the main cavity 16 within the valve housing 12.

A third sleeve member 80 having a generally tubular or cylindrical form defined by an outer wall 82 that extends longitudinally between opposed open ends 84, 86. The third sleeve member 80 is arranged co-axially around the second sleeve member 54 and a portion of the first sleeve member 40 with one of the open ends 86 of the third sleeve member 80 being inserted into the first region 22 of the main cavity 16 through the first open end 18 formed in the valve housing 12. The third sleeve member 80 has a diameter that is greater than the diameter of the second sleeve member 54. Accordingly, an annular shaped fluid passage 88 is formed in the gap or space provided between the outer wall 56 of the second sleeve member 54 and the wall 82 forming the third sleeve member 80, the annular shaped fluid passage 88 in the subject embodiment corresponding to the first outlet passage 15. An outwardly extending peripheral flange or rib 89 is formed in the outer wall 82 of the third sleeve member 80 proximal to the open end 86 of the sleeve 80 that is inserted into the valve housing 12. The outwardly extending peripheral flange or rib 89 extends radially outwardly by a distance so as to abut and seal against the inner wall of the main cavity 16 forming the first region 22. In some instances, the outwardly extending peripheral flange or rib 89 may also abut against the first peripheral flange 30 formed within main cavity 16 to ensure that the third sleeve member 80 has been fully inserted into the first region 22 of the main cavity 16. When the third sleeve member 80 is arranged around the second sleeve member 54 and inserted into the first region 22 of the main cavity 16, fluid communication is established between the annular shaped fluid passage 88 and the second fluid chamber 72 formed in the second region 24 of the main cavity 16.

In the illustrated embodiment, a collar 90 having a central opening 92 is positioned over the third sleeve member 80 and has a first end 94 that is inserted into first opening 18 and abuts against the outwardly extending peripheral flange or rib 89, and a second end 96 in the form of a flanged opening having a first surface 97 that that abuts and seals against the valve housing 12 thereby holding and/or securing the third sleeve member 80 in position and sealing any remaining open portion of the first open end 18 of the main cavity 16 formed in the valve housing 12. The second end 96 of the collar 90 also defines an second outer, mounting surface 98 for abutting and/or sealing against the housing of the automobile system component when the valve apparatus 10 is mounted thereto, the portions of the second and third sleeve members 54, 80 being received in a corresponding co-axial inlet/outlet opening in the housing of the fluid source (not shown).

A valve mechanism 100 is slidingly mounted within the first sleeve member 40 in order to control the flow of fluid through the valve apparatus 10. The valve mechanism 100 is typically in the form of a thermally activated linear actuator, although electronic valve mechanisms may also be used, the valve mechanism 100 comprising an outer housing 102 defining an open, interior space 103 that defines the first valve chamber, the first valve chamber 103 therefore having a first end 104 coupled to a spring mechanism 106. The spring mechanism 106 has a first, relaxed position (shown in FIGS. 1 and 1A) and has a free end that abuts or engages the closed second end 46 of the first sleeve member 40. The outer housing 102 has a second, open end 107 generally aligned with the open end 44 of the first sleeve member 40 and in fluid communication with the open interior space defined by the second sleeve member 54 forming the first fluid inlet passage 13. The thermal actuator comprises an actuator body 108 that, in some embodiments, contains a contractionally expandable material and a piston 110 (shown more clearly in FIG. 2) and in other embodiments may be an electronically activated actuator body. The piston 110 has a first end coupled to the actuator body 108 and a second end 112 that engages the first end of the outer housing 102. A first fluid opening 114 is formed in the outer housing 102 and is generally aligned with fluid openings 48, 62 formed in the first and second sleeve members 40, 54 and the second fluid inlet 19 formed in the valve housing 12 when the valve mechanism 100 is in its first operational position (as shown in FIG. 1) with the spring mechanism 106 in its relaxed state. Accordingly, fluid opening 114 establishes fluid communication between the open interior space or first valve chamber 103 of the outer housing 102 of the valve mechanism 100, second fluid chamber 72 and the annular shaped fluid passage 88 formed by the third sleeve member 80. A second fluid opening 116 is also formed in the outer housing 102 of the valve mechanism 100, the second fluid opening 116 being sealed-off by a portion of the outer wall 41 of the first sleeve member 40 when the valve mechanism 100 is in its first, operational position.

Figure 1A:
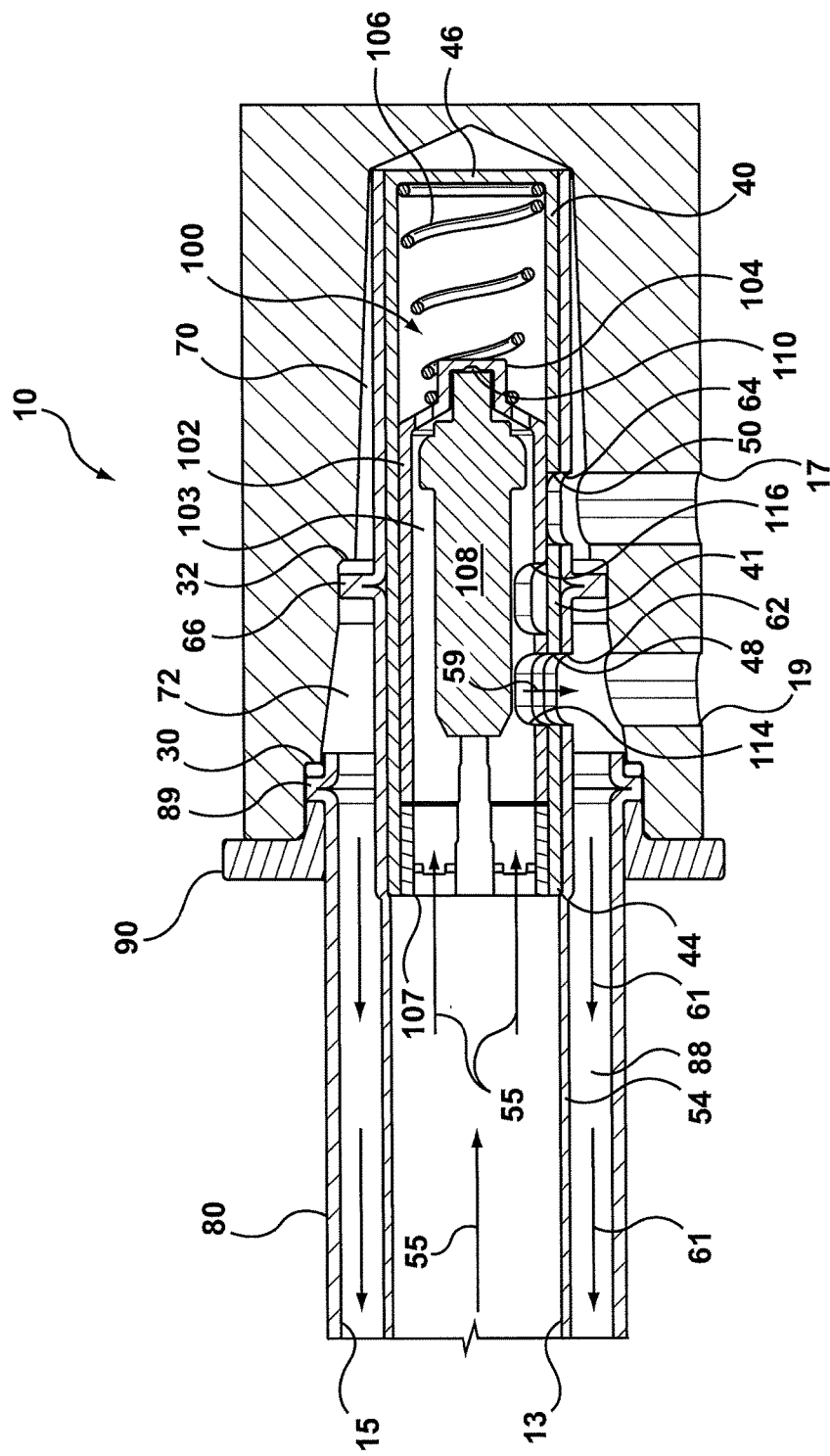
FIG. 1A is a cross-sectional view of the valve apparatus shown in FIG. 1 illustrating the components of the valve mechanism in particular.
Figure 7:
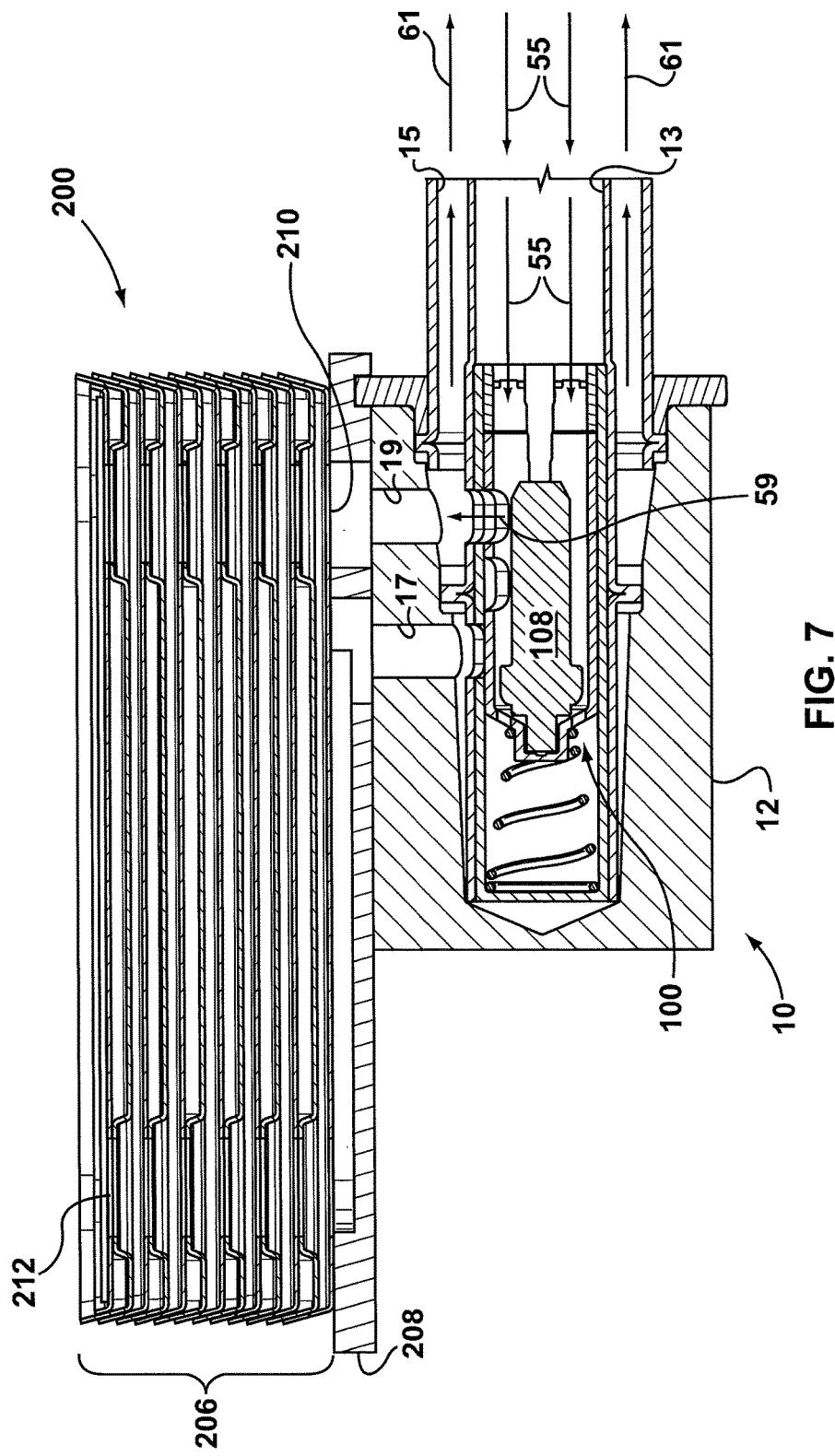
FIG. 7 is a cross-sectional view of a heat exchanger assembly incorporating the valve apparatus of FIG. 1 illustrating the first operational state.
Figure 8:
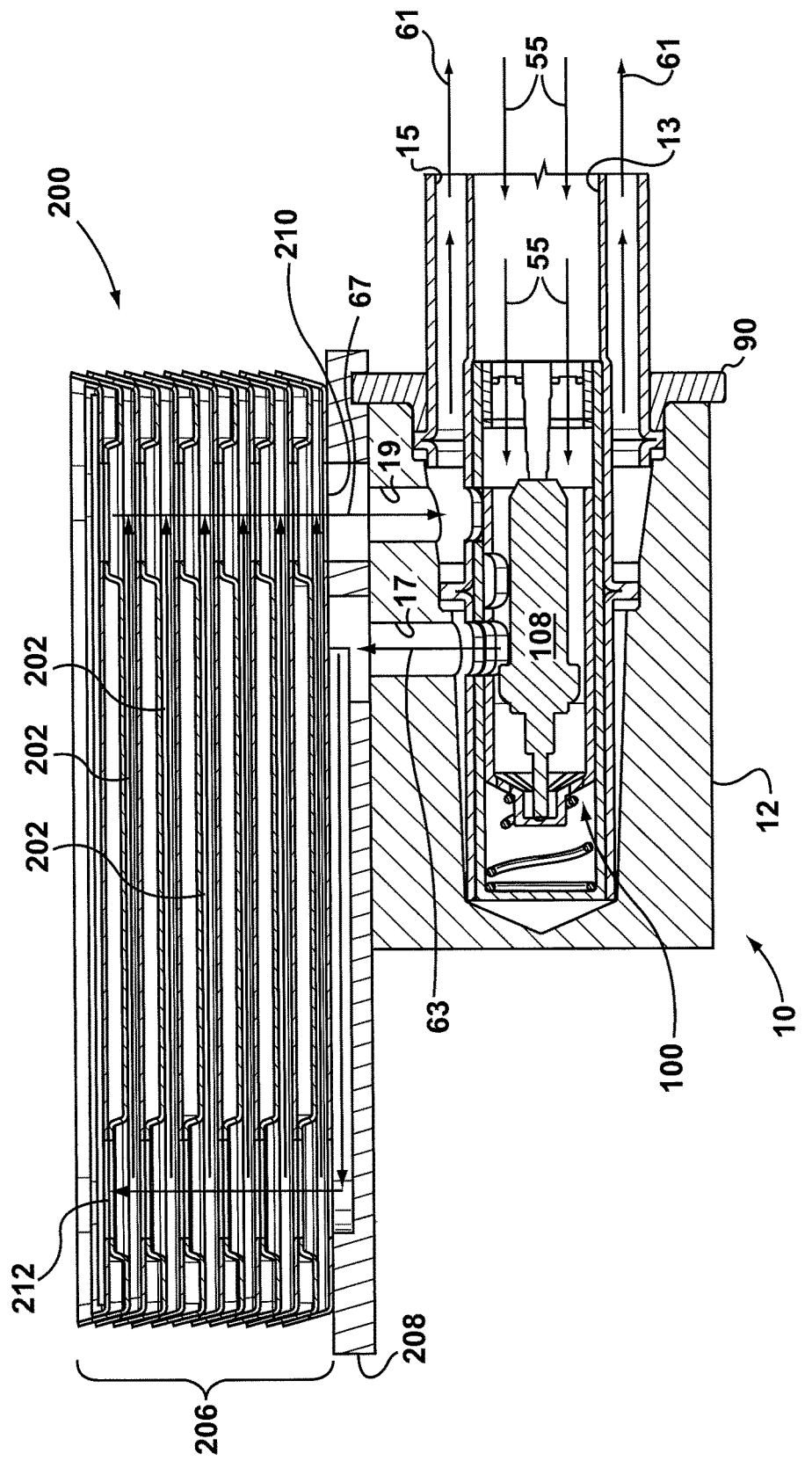
FIG. 8 is a cross-sectional view of a heat exchanger assembly incorporating the valve apparatus of FIG. 2 illustrating the second operational state.

In use, as illustrated in FIGS. 7-8, the valve apparatus 10 is generally arranged in conjunction with a heat exchanger 200 for controlling the flow of a heat exchange fluid to the heat exchanger 200 for cooling/warming, although in other embodiments the heat exchanger 200 may be remotely connected to the valve apparatus 10. In the subject illustrated embodiment, the valve apparatus 10 is intended to be mounted directly to the outer housing of the automobile system component and is also adapted for mounting directly on the corresponding heat exchanger 200, the valve apparatus 10 and the heat exchanger 200 together forming a heat exchanger apparatus. Heat exchanger 200 may be in the form of any suitable heat exchanger having alternating first and second fluid passageways 202, 204 for bringing two different heat exchange fluids into heat exchange relationship with one another. While a stacked, dished plate style heat exchanger is shown, it will be understood that this is merely exemplary and that any suitable heat exchanger generally comprising a heat exchanger core 206 and a base plate or mounting plate 208 may be used. During operation, fluid from the fluid source (i.e. transmission, engine, etc.) enters the valve apparatus 10 through first inlet passage 13 and travels through the central passage formed by the second sleeve member 54 and into the open interior space or first valve chamber 103 formed by the outer housing 102 of the valve mechanism 100 as illustrated schematically by directional flow arrows 55. The temperature of the fluid entering the valve mechanism 100 is sensed by the actuator body 108 either by means of the contractually expandable material or through electronic means. When the temperature of the fluid entering the valve mechanism 100 is within a first, predetermined range indicating that the fluid does not require cooling by the corresponding heat exchanger 200, the valve mechanism 100 remains in its first illustrated operational state or position (as shown in FIGS. 1,1A and 7), thereby directing the fluid through aligned fluid openings 114, 48, 62 formed in the outer casing 102 and first and second sleeve members 40, 54, as illustrated by directional flow arrow 59 and back to the fluid source through annular fluid passage 88 or first outlet passage 15 in a counterflow arrangement to the direction of incoming flow through the first inlet passage 13 as illustrated by directional flow arrows 61. Because fluid openings 114, 48 and 62 are aligned with the outlet manifold 210 of the corresponding heat exchanger 200, which is in fluid communication with second inlet 19 of the valve apparatus 10 in the first operational state, fluid resistance within the overall system prevents fluid from exiting the valve apparatus 10 through opening 19 and entering the heat exchanger through the outlet manifold 210 and, instead, causes the fluid to be directed back to the fluid source through annular fluid passage 88 or the first outlet passage 15. Therefore, in the embodiment shown in FIG. 7, the fluid entering the valve apparatus 10 from the fluid source (see flow directional arrows 55) is directed away from entering heat exchanger 200 and returned to the fluid source or directed elsewhere in the overall fluid and/or heat exchange system.

Figure 4:
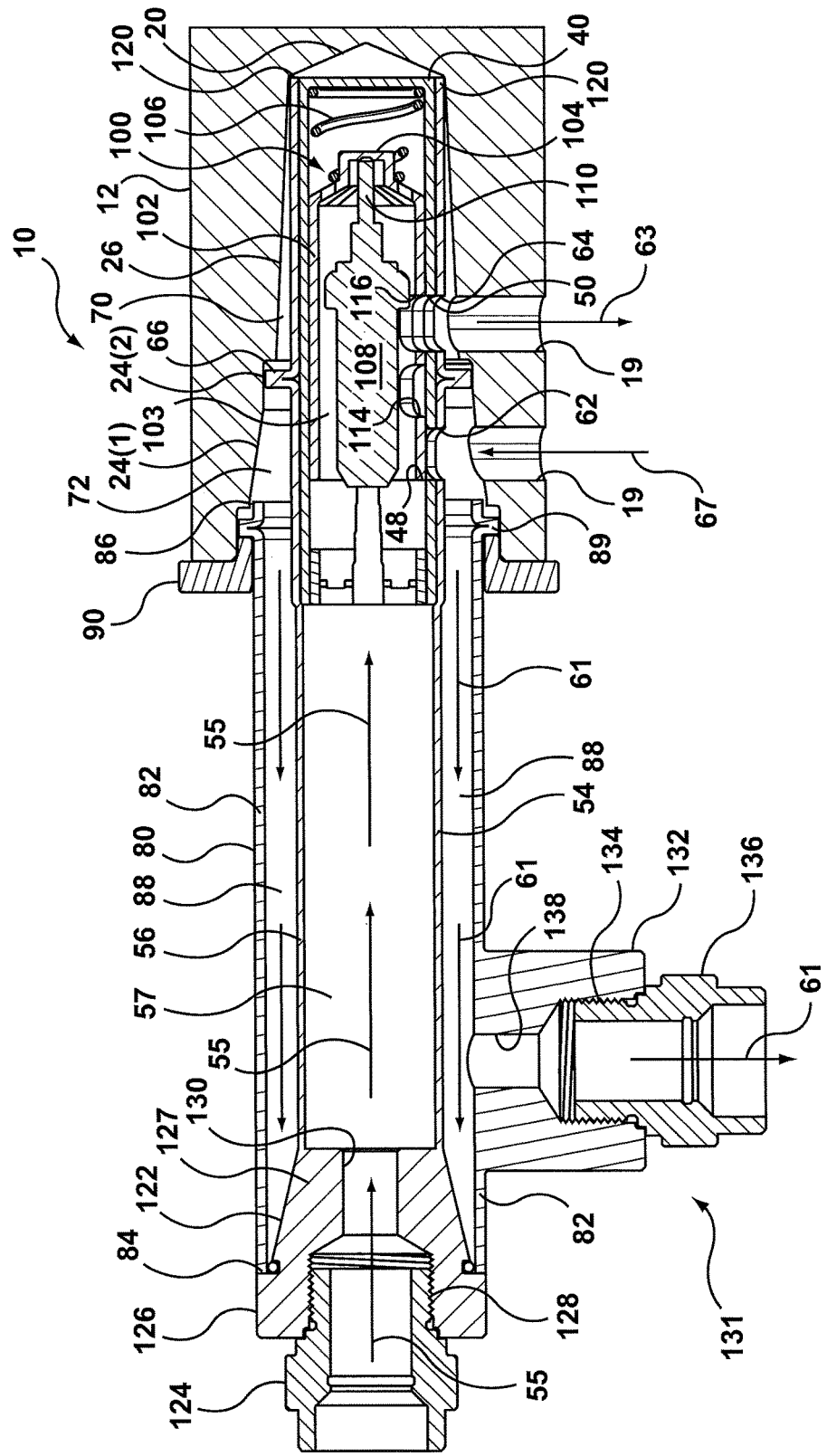
FIG. 4 is a cross-sectional view of the valve apparatus of FIG. 3 in a second operational state.

As the temperature of the fluid entering the valve apparatus 10 increases, the actuator body 108 is activated by the thermal material housed therein that expands due to the increase in temperature (or through electronic means) which causes the piston 110 to be pushed out of the actuator body 108 and to push against the first end 104 of the outer casing 102. The action of the piston 110 against the outer casing 102 causes the spring mechanism 106 to contract against the closed end 44 of the first sleeve member 40 thereby causing the outer casing 102 to slide along wall 41 of the first sleeve member 40 bringing the second fluid opening 116 into alignment with the openings 50, 64 formed in the first and second sleeve members 40, 54 and the second fluid outlet 17 formed in the valve housing 12, as shown for instance in FIGS. 2 and 4. As the valve mechanism 100 assumes its second, operational state or position, as illustrated in FIGS. 2, 4 and 8, fluid opening 116 formed in the valve outer casing 102 is brought into alignment with fluid openings 50, 64 formed in the first and second sleeve members 40, 54 thereby establishing fluid communication between the open interior space 103 or first valve chamber of the valve mechanism 100, the third fluid chamber 70 and second fluid outlet 17 allowing the fluid to enter the corresponding heat exchanger 200. Due to the sliding movement of the outer housing 102 of the valve mechanism 100, fluid opening 114 becomes effectively sealed or closed-off by the outer wall 41 of the first sleeve member 40. Accordingly, fluid entering the valve apparatus 10 through first inlet passage 13 and travelling through the central passage formed by the second sleeve member 54 and into the open interior space or first valve chamber 103 formed by the outer housing 102 of the valve mechanism 100 (as illustrated schematically by directional flow arrows 55) is directed through openings 116, 50, 64 and second fluid outlet 17 in the valve housing 12 to the corresponding fluid inlet manifold 212 of the corresponding heat exchanger 200, as illustrated schematically by directional flow arrows 63 in FIGS. 2 and 8. The fluid passes through the corresponding fluid passages formed within heat exchanger 200 and exits the heat exchanger 200 through outlet manifold 210. Fluid exiting the heat exchanger 200 is returned to the valve apparatus 10 through second fluid inlet 19, as illustrated schematically by directional flow arrow 67 and is returned to the fluid source or is directed elsewhere in the overall system through the annular outlet passage 88. As fluid openings 48, 62 in the first and second sleeve members 40, 54 are effectively closed or sealed-off by the outer casing 102 of the valve mechanism 100, the fluid entering second fluid inlet 19 is directed back to the fluid source through annular fluid passage 88 which serves as the first fluid outlet passage 15, as illustrated schematically by directional flow arrows 61. Accordingly, the fluid entering and exiting the valve apparatus 10 flows through main inlet and outlet passages 13, 15 which both have a common, central longitudinal axis for directing fluid to and from the fluid source.

A second exemplary embodiment of the valve apparatus 10 will now be described in reference to FIGS. 3 and 4, wherein like reference numerals have been used to identify similar features.

In this exemplary embodiment, the valve apparatus 10 is intended to be mounted directly to the corresponding heat exchanger (not shown) but remotely mounted to the fluid source, i.e. the housing of the automobile system component, for instance, the transmission or engine housing as opposed to being mounted directly to both the heat exchanger and the corresponding fluid source contemplated by the embodiment illustrated in FIGS. 7-9. Accordingly, in this embodiment the valve housing 12 is intended to be positioned directly on the corresponding heat exchanger similar to the embodiment shown in FIGS. 7-9 so that fluid openings 17, 19 are in direct fluid communication with one of the fluid inlets to the heat exchanger and the corresponding fluid outlet on the heat exchanger. The valve housing 12 itself remains essentially the same as the valve housing 12 described above, with the valve housing 12 being formed with a main cavity 16 having a first region 22 of constant diameter, a second region having a first portion 24(1) that tapers or gradually decreases in diameter and a second portion 24(2) of constant diameter, and a third region 26 that tapers or gradually decreases in diameter along the length thereof to the closed end 20 of the main cavity 16.

The first sleeve member 40 is arranged within the main cavity 16 in the same manner as described above and houses valve mechanism 100. Accordingly, the first sleeve member 40 is mounted within the main cavity 16 so that the second, closed end 46 of the sleeve member 40 generally abuts or is arranged proximal to the closed, second end 20 of the main cavity 16. The first open end 44 of the first sleeve member 40 is arranged approximately in-line with or slightly exterior to the first open end 18 of the main cavity 16 or valve housing 12, the first sleeve member 40 therefore being aligned along the central, longitudinal axis of the main cavity 16 of the valve housing 12 and extending through the first, second and third regions 22, 24, 26. The first and second fluid openings 48, 50 formed in the outer wall 41 of the first sleeve member 40 are axially aligned with and in fluid communication with the second fluid inlet and second fluid outlet openings 19, 17 of the valve housing 12.

The valve mechanism 100 is mounted within the first sleeve member 40 in the same manner as described above in connection with the exemplary embodiment of FIGS. 1, 1A and 2. Accordingly, the outer housing 102 slidingly engages the inner surface of the outer wall 41 forming the first sleeve member 40 with the spring member 106 being coupled to a first end of the outer housing 102 and with the free end of the spring member 106 abutting or engaging with the closed second end 46 of the first sleeve member 41. The actuator body 108 and piston 110 are arranged within the outer housing 102 and serve to move the valve mechanism between first and second valve positions. The first operating position of the valve mechanism 100 is shown in FIG. 3 wherein the first fluid opening 114 is effectively aligned with the second inlet 19 formed in the valve housing 12, while the second fluid opening 116 formed in the outer housing 102 of the valve mechanism 100 is effectively sealed-off or closed by a portion of the outer wall 41 forming the first sleeve member 40.

A second sleeve member 54 is mounted exterior to the first sleeve member 40 in a similar manner as described above in connection with the exemplary embodiment of FIGS. 1-2. Accordingly, the second sleeve member 54 has a generally tubular or cylindrical form defined by an outer wall 56. In the subject embodiment, however, the outer wall 56 extends between a first open end 120 that is arranged generally in-line with the closed, second end 46 of the first sleeve member 40 and proximal to or adjacent the closed end 20 of the main cavity 16, and a second open end 122 in the form of a fluid coupling for mating with or receiving a corresponding fluid fitting 124 from the fluid source, i.e. the automobile system component such as the automobile transmission or engine. Accordingly, the second open end 122 is in the form of the female component of a fluid coupling that is integrally formed as part of the second sleeve member 54. In the subject exemplary embodiment, the second open end 122 has a flanged exterior end 126 and a main body portion 127, the main body portion 127 extending away from the outer wall 56 defining the tubular or cylindrical form of the second sleeve member 54 to the flanged exterior end 126. Accordingly, the exterior diameter of the main body portion 127 gradually increases from the diameter of the outer wall 56 of the second sleeve member 54 as it extends towards the flanged exterior end 126. A cavity 128 is formed in the flanged end 126 and a portion of the main body portion 127 for receiving the corresponding fluid coupling 124. The cavity 128 may be formed with internal threads for mating with corresponding threads formed on the fluid coupling 124 or may be secured together in any suitable manner to ensure a fluid-tight connection. A fluid passageway 130 extends from the cavity 128 portion through to the open interior space 57 formed by the outer wall 56 of the second sleeve member 54 thereby establishing fluid communication between the fluid source through the externally mounted fluid coupling 124 and the valve mechanism 100 housing within the first and second sleeve members 40, 54.

The third sleeve member 80 is generally in the same form as described above-in connection with the exemplary embodiment of FIGS. 1-2 in that the third sleeve member 80 has a generally tubular form defined by an outer wall 82 extending longitudinally between opposed open ends 84, 86. As in the previously described embodiments, outwardly extending peripheral flange or rib 89 is formed proximal the second end 86 thereof for engaging and sealing against the inner surface of the first region 22 of the main cavity 16 when the third sleeve member 80 is positioned within the valve housing 12. The first open end 84 of the third sleeve member 80 is arranged around the main body portion 127 of the second end 122 and abuts and seals against the flanged exterior end 126 of the second end 122 of the second sleeve member 54. As the third sleeve member 80 has an overall diameter that is greater than the outer diameter of the second sleeve member 54, the annular shaped fluid passage 88 is formed in the gap or space provided between the outer wall 56 of the second sleeve member 54 and the wall 82 forming the third sleeve member 80.

In the subject embodiment, since the first open end 84 of the third sleeve member 80 abuts and seals against the flanged exterior end 126 of the fluid coupling formed at the second end 120 of the second sleeve member 54 and does not provide an annular shaped fluid opening at the end of the fluid outlet passage 15 for returning fluid to the fluid source, a fluid outlet 131 is formed integrally within the outer wall 82 of the third sleeve member 80 proximal to the first end 84 thereof. The fluid outlet 131 is generally in the form of a cylindrical projection 132 that extends away from the outer wall 82 of the third sleeve member 80 that is in fluid communication with the annular shaped flow passage 88 that serves as the fluid outlet passage 15. The cylindrical projection 132 has a cavity 134 formed therein for receiving a corresponding fluid coupling 136 associated with the fluid source. Accordingly, the cavity 134 may be formed with internal threads for engaging with corresponding threads formed on the fluid coupling 136 to ensure a fluid-tight seal. A fluid passageway 138 extends from the cavity 134 through the cylindrical projection 132 and outer wall 82 of the third sleeve member thereby establishing fluid communication between annular fluid passageway 88 or fluid outlet passage 15 and the fluid source by means of the interconnection between fluid coupling 136 and fluid outlet 131.

Since the valve apparatus 10 in the subject embodiment is intended to be mounted directly to the corresponding heat exchanger, similar to the embodiment shown in FIGS. 7-9 using any suitable method for integrating the valve apparatus 10 with the heat exchanger and is intended to be remotely mounted to the fluid source (i.e. the automobile transmission or engine), in operation fluid is directed to the valve apparatus 10 from the fluid source by means of any suitable fluid line that serves to transfer fluid exiting the housing of the fluid source to the valve apparatus 10 through fluid coupling 124 and fluid passageway 130 of the second end 122 of the second sleeve member 54. The fluid then travels through the second sleeve member 54 where it will enter the valve mechanism 100 through the open ends of the first sleeve member 40 and the outer housing 102 as illustrated schematically by directional flow arrows 55.

Figure 3:
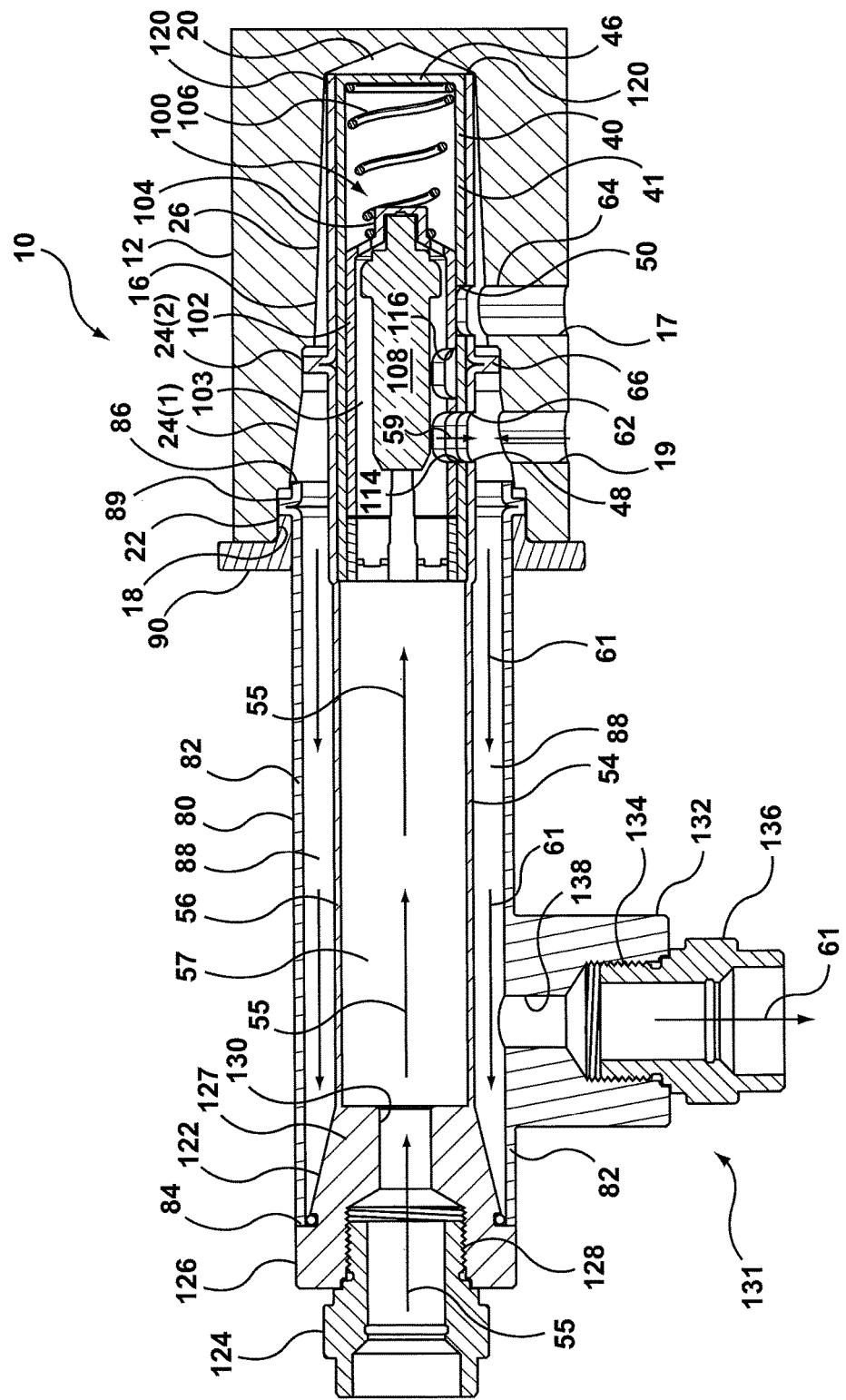
FIG. 3 is a cross-sectional view of another example embodiment of a valve apparatus according to the present disclosure in a first operational state.

When the temperature of the fluid entering the valve mechanism 100 is within a first predetermined range indicating that the fluid does not be directed to the corresponding heat exchanger for cooling (and/or heating), the valve mechanism 100 remains in its first illustrated operational state or position (as shown in FIG. 3) with the fluid exiting the valve mechanism 100 through fluid openings 114, 48, 62 formed in the outer casing 102 and first and second sleeve members 40, 54, as illustrated schematically by flow directional arrow 59, and back to the fluid source through annular fluid passage 88, which serves as the first fluid outlet passage 15, where it is returned to the fluid source through any suitable fluid line that is coupled to fluid outlet 131 via fluid coupling or fitting 136, as shown schematically by directional flow arrows 61. As in the previously described embodiment, because fluid openings 114, 48 and 62 are aligned with the outlet of the corresponding heat exchanger which is in fluid communication with the second inlet 19 of the valve apparatus 10, fluid resistance within the overall system prevents fluid from exiting the valve apparatus 10 through opening 19 and entering the heat exchanger and, instead, causes the fluid to be directed back to the fluid source through annular fluid passage 88 or first fluid outlet passage 15.

As the temperature of the fluid entering the valve apparatus 10 increases, the valve mechanism 100 assumes its second operational position as illustrated in FIG. 4. As shown in the drawing, as the temperature of the fluid increases, the actuator body 108 of the valve mechanism 100 is activated by the thermal material housed therein expanding due to the increase in temperature (or through electronic means in the case of an electronic valve mechanism) causing the piston 110 to be pushed out of the actuator body 108 and to act against the first end 104 of the outer casing 102. The action of the piston 110 against the outer casing 102 causes the spring mechanism 106 to contract against the closed end 44 of the first sleeve member 40 thereby causing the outer casing 102 to slide along wall 41 of the first sleeve member 40 bringing the second fluid opening 116 into alignment with the openings 50, 64 formed in the first and second sleeve members 40, 54 and the second fluid outlet 17 formed in the valve housing 12. As the valve mechanism 100 assumes its second, operational state or position (as illustrated in FIG. 4) fluid opening 116 formed in the valve outer casing 102 is brought into alignment with second fluid outlet 17 of the valve housing 12 which is in direct fluid communication with the fluid inlet manifold 212 formed on the corresponding heat exchanger 200, similar to the embodiment shown in FIGS. 7-9. As fluid opening 116 aligns with the first fluid outlet 17 of the valve housing 12, fluid opening 114 becomes effectively sealed or closed-off by the outer wall 41 of the first sleeve member 40. Accordingly, fluid entering the valve apparatus 10 through fluid coupling 124 and the second end 122 of the second sleeve member 54 travels through the central passage 57 formed by the second sleeve member 54 and into the open interior space or first valve chamber 103 formed by the outer housing 102 of the valve mechanism 100 and is directed out of the valve housing 12 through fluid openings 116, 50, 64 and second fluid outlet 17 to the inlet of the corresponding heat exchanger 200 as illustrated schematically by directional flow arrow 63. Fluid exiting the heat exchanger is then returned to the valve apparatus 10 through second fluid inlet 19 (as illustrated schematically by directional flow arrow 67) which fluid is then, due to the sealing-off of fluid openings 48, 62 in the first and second sleeve members 40, 54 by the outer casing 102 of the valve mechanism 100, directed back to the fluid source through annular fluid passage 88 or first fluid outlet passage 15 where it is returned to the fluid source through fluid outlet 131 and fluid coupling 136 as illustrated by directional flow arrows 61. By attaching the fluid source to the valve apparatus 10 by way of separate fluid lines that are then connected to the valve apparatus 10 by way of fluid connections provided by the inlet end 122 of the second sleeve member 54 and the outlet 131 formed in the third sleeve member 80, the valve apparatus 10, and associated heat exchanger 200) can be mounted remotely to the fluid source which provides for flexibility of design of the overall fluid systems within the automobile.

Figure 5:
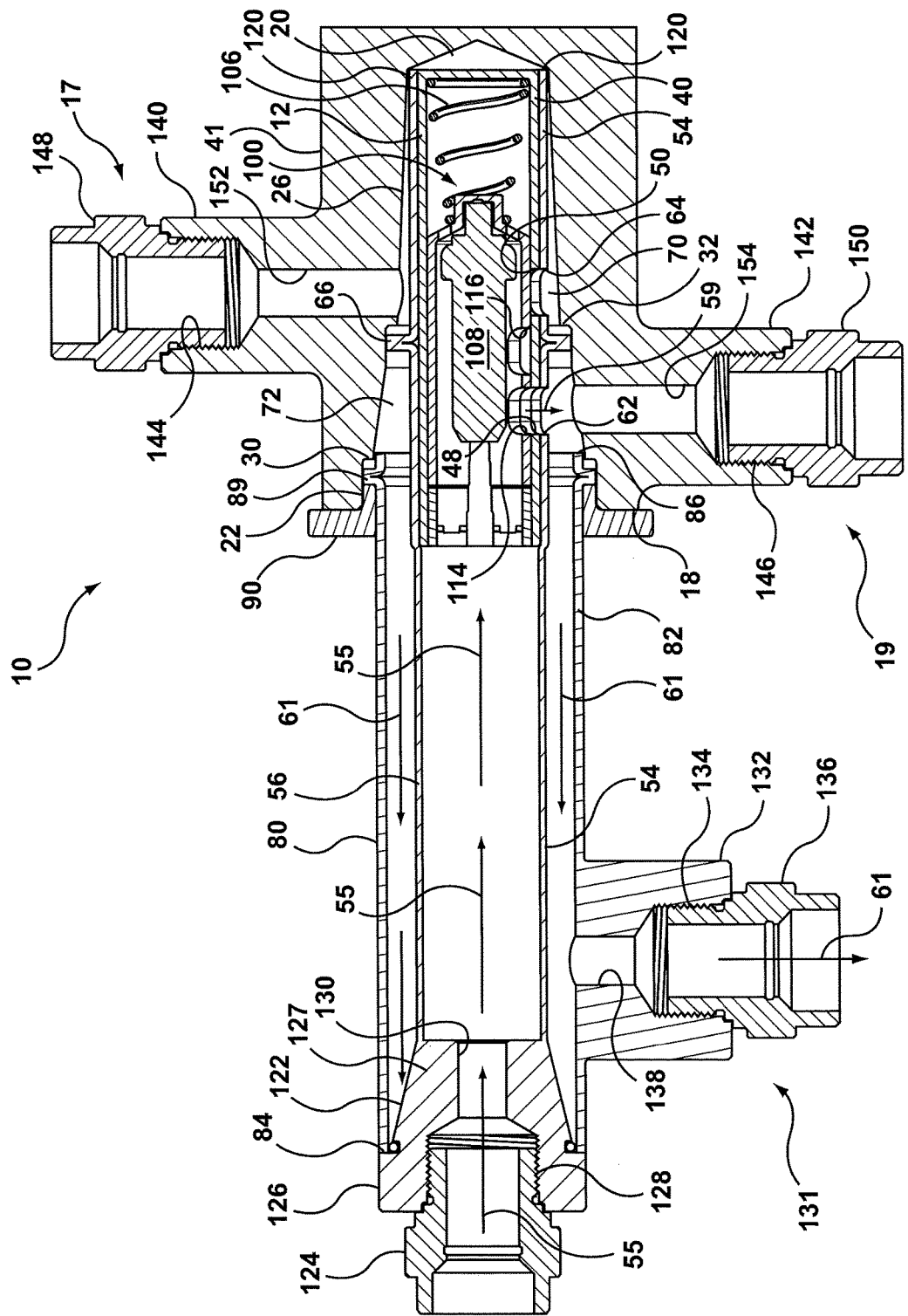
FIG. 5 is a cross-sectional view of a further example embodiment of valve apparatus according to the present disclosure in a first operational state.

A third exemplary embodiment of the valve apparatus 10 will now be described in reference to FIGS. 5 and 6, wherein like reference numerals have been used to identify similar features.

In the subject embodiment, the valve apparatus 10 is a self-contained unit that is separate from and intended to be remotely mounted with respect to both the fluid source (i.e. the transmission or the engine, for example) and the corresponding or associated heat exchanger. Therefore, as in the above-described exemplary embodiment illustrated in FIGS. 3 and 4, the valve apparatus 10 is comprised of a valve housing 12 and a series of stacked first, second and third sleeve members 40, 54, 80 that are inserted and mounted within a main cavity 16 formed in the valve housing 12. As in the previously described embodiment, the main cavity 16 is comprised of first, second and third regions 22, 24, 26 that, in combination, generally taper from a first open end 18 formed in the valve housing 12 to a second closed end 20 embedded within the valve housing 12. The first region 22 extends from the open first end 18 to a first peripheral edge 30 at a generally constant diameter. The second region 24 has a first portion 24(1) that gradually tapers from a first diameter defined by the peripheral edge 30 to a second, smaller diameter, and a second portion 24(2) that extends at a constant diameter (i.e. the second, smaller diameter) to a second peripheral edge 32. The third region 26 gradually tapers from the second peripheral edge 32 to the closed second end 20 of the main cavity.

The first sleeve member 40 is arranged within the main cavity 16 in the same manner as in the above-described embodiments with the valve mechanism 100 slidingly mounted within the first sleeve member 40. The second sleeve member 54 is arranged exterior to and in contact with the outer wall 41 of the first sleeve member 40. In the subject embodiment, the second sleeve member 54 takes the form of the second sleeve member 54 as described in connection with the embodiment illustrated in FIGS. 3 and 4. Accordingly, the second sleeve member 54 has a generally tubular or cylindrical form defined by outer wall 56 that extends between a first open end 120 that is arranged generally in-line with the closed, second end 46 of the first sleeve member 40 and proximal to or adjacent the closed end 20 of the main cavity 16. The second sleeve member 54 has a second open end 122 in the form of a fluid coupling for mating with or receiving a corresponding fluid fitting 124 from the fluid source, i.e. the automobile system component such as the automobile transmission or engine, the second end 122 and the corresponding fluid fitting or coupling 124 together defining the first inlet 13 of the valve apparatus 10.

When the second sleeve member 54 is arranged within the main cavity 16, the outwardly extending peripheral flange or rib 66 formed in the outer wall 56 of the second sleeve member 54 contacts and seals against the inner surface of the man cavity 16 defined by the second portion 24(2) of the second region 24. The outwardly extending peripheral flange or rib 66, therefore, effectively divides the main cavity 16 into two, separate fluid isolated regions thereby forming second and third fluid chambers 72, 70.

The third sleeve member 80 is generally in the same form as the third sleeve member 80 described in connection with the embodiment illustrated in FIGS. 3 and 4. Accordingly, the third sleeve member 80 has a generally tubular form defined by outer wall 82 that extends longitudinally between opposed open ends 84, 86. An outwardly extending peripheral flange or rib 89 is formed proximal the second end 86 of the third sleeve member 80 for contacting and sealing against the inner surface of the first region 22 of the main cavity 16 when the third sleeve member 80 is positioned within the open first end 18 of the valve housing 12. The first open end 84 of the third sleeve member 80 is arranged around the main body portion 127 of the second end 122 of the second sleeve member 54 and abuts and seals against the flanged exterior end 126 thereof. As the third sleeve member 80 has an overall diameter that is greater than the outer diameter of the second sleeve member 54, the arrangement of the third sleeve member 80 around the second sleeve member 54 forms the annular shaped fluid passage 88 in the gap or space provided between the outer wall 56 of the second sleeve member 54 and the wall 82 forming the third sleeve member 80, the annular shaped fluid passage 88 being in fluid communication with the second fluid chamber 72.

As in the previously described embodiment, third sleeve member 80 is formed with fluid outlet 131 integrally formed within the outer wall 82 of the third sleeve member 80 proximal to the first end 84 thereof. The fluid outlet 131 is generally in the form of a cylindrical projection 132 that extends away from the outer wall 82 of the third sleeve member 80. The cylindrical projection 132 has a cavity 134 formed therein for receiving a corresponding fluid coupling 136 associated with the fluid source. Accordingly, the cavity 134 may be formed with internal threads for engaging with corresponding threads formed on the fluid coupling 136 to ensure a fluid-tight seal. A fluid passageway 138 extends from the cavity 134 through the cylindrical projection 132 and outer wall 82 of the third sleeve member thereby establishing fluid communication between annular fluid passageway 88, or first fluid outlet passage 15, and the fluid source by means of the interconnection between fluid coupling 136 and fluid outlet 131. Therefore, while the fluid flowing through annular shaped fluid passage 88 exits the valve apparatus 10 through fluid outlet 131 that is arranged laterally with respect the longitudinal axis of the second and third sleeve members 54, 80 before being returned to the fluid source, the primary flow direction of the fluid flowing through annular shaped fluid passage 88, or first fluid outlet passage 15, is co-axial and generally opposite to the primary flow direction of the fluid entering the valve apparatus 10 through fluid inlet 120.

Since the valve apparatus 10 is intended to be remotely mounted with respect to both the fluid source and the corresponding heat exchanger 200, the second fluid outlet 17 and the second fluid inlet 19 formed in the valve housing 12 are adapted to allow for corresponding fluid lines and fluid fittings or couplings to be attached to the valve housing 12. Accordingly, rather than having the second fluid outlet 17 and the second fluid inlet 19 arranged adjacent to each other as openings formed in a side of the generally rectangular valve housing (as in the embodiments shown in FIGS. 1-4), in the subject embodiment the second fluid outlet 17 and second fluid inlet 19 are in the form of generally cylindrical projections 140, 142 integrally formed as part of the valve housing 12, the cylindrical projections 140, 142 extending away from the generally rectangular valve housing 12, with fluid outlet 17 being arranged opposite to and laterally spaced apart from fluid inlet 19. However, it will be understood that the exact location of the second fluid outlet 17 and second fluid inlet 19 on the valve housing 12 may vary depending upon specific design requirements for a particular application provided that fluid outlet 17 is in fluid communication with third fluid chamber 70 formed by the gap/space created between the outer wall 56 of the second sleeve member 54 and the third region 26 of the main cavity 16 and that the fluid inlet 19 is in fluid communication with the second fluid chamber 72 formed by the gap/space created between the outer wall 56 of the second sleeve member 54 and the first portion 24(1) of the second region 24 of the main cavity 16. Cylindrical projections 140, 142 each have a cavity 144, 146 formed therein for receiving a corresponding fluid coupling 148, 150 associated with the corresponding heat exchanger 200. In the embodiment shown, fluid outlet 17 and fluid coupling 148 are fluidly coupled to a fluid inlet on the corresponding heat exchanger 200 for delivering fluid passing through the valve apparatus 10 to the heat exchanger for cooling/heating. Fluid outlet 19 and fluid coupling 150 are fluidly coupled to the corresponding fluid outlet 210 of the heat exchanger 200 for returning the cooled/heated fluid from the heat exchanger, through the valve apparatus 10 and back to the fluid source (i.e. the transmission or engine, for example.) Accordingly, each cavity 144, 146 may be formed with internal threads for engaging with corresponding threads formed on the fluid coupling 148, 150 to ensure a fluid-tight seal is formed at the interconnections between the valve apparatus 10 and the corresponding heat exchanger. Fluid passageways 152, 154 extend, respectively, from the corresponding cavity 144, 146 in the cylindrical projection 140, 142 through the valve housing 12 thereby establishing fluid communication between fluid outlet 17 and the third fluid chamber 70 and between fluid inlet 19 and the second fluid chamber 72.

In operation, the valve mechanism 100 operates in the same manner as described above in connection with the embodiments illustrated by FIGS. 1-4. Accordingly, fluid from the fluid source (i.e. the transmission or engine, for example) travels though corresponding fluid lines and enters valve apparatus 10 through fluid coupling 124 and the second end 122 of the second sleeve member 54. The fluid travels longitudinally through the second sleeve member 54 (as indicated by directional flow arrows 55) and enters the valve mechanism 100 housed within the first sleeve member 40 where the temperature of the fluid is sensed by the thermally (or electronically) activated adapter body 108. When the temperature of the fluid is within a first, predetermined range, the valve mechanism 100 remains in its first position or first operational state illustrated in FIG. 5 and the fluid exits the valve mechanism 100 through aligned fluid openings 114, 48, 62 formed in the outer housing 102 of the valve mechanism 100 and the first and second sleeve members 40, 54 into second fluid chamber 72. The fluid is then returned to the fluid source by travelling longitudinally through annular shaped fluid passage 88 before exiting the valve apparatus 10 through fluid outlet 131 as indicated by directional flow arrows 61. As described in connection with the previous embodiments, fluid within second fluid chamber 72 is prevented from entering the corresponding heat exchanger 200 through fluid inlet 19 due to the overall flow resistance within the system.

Figure 6:
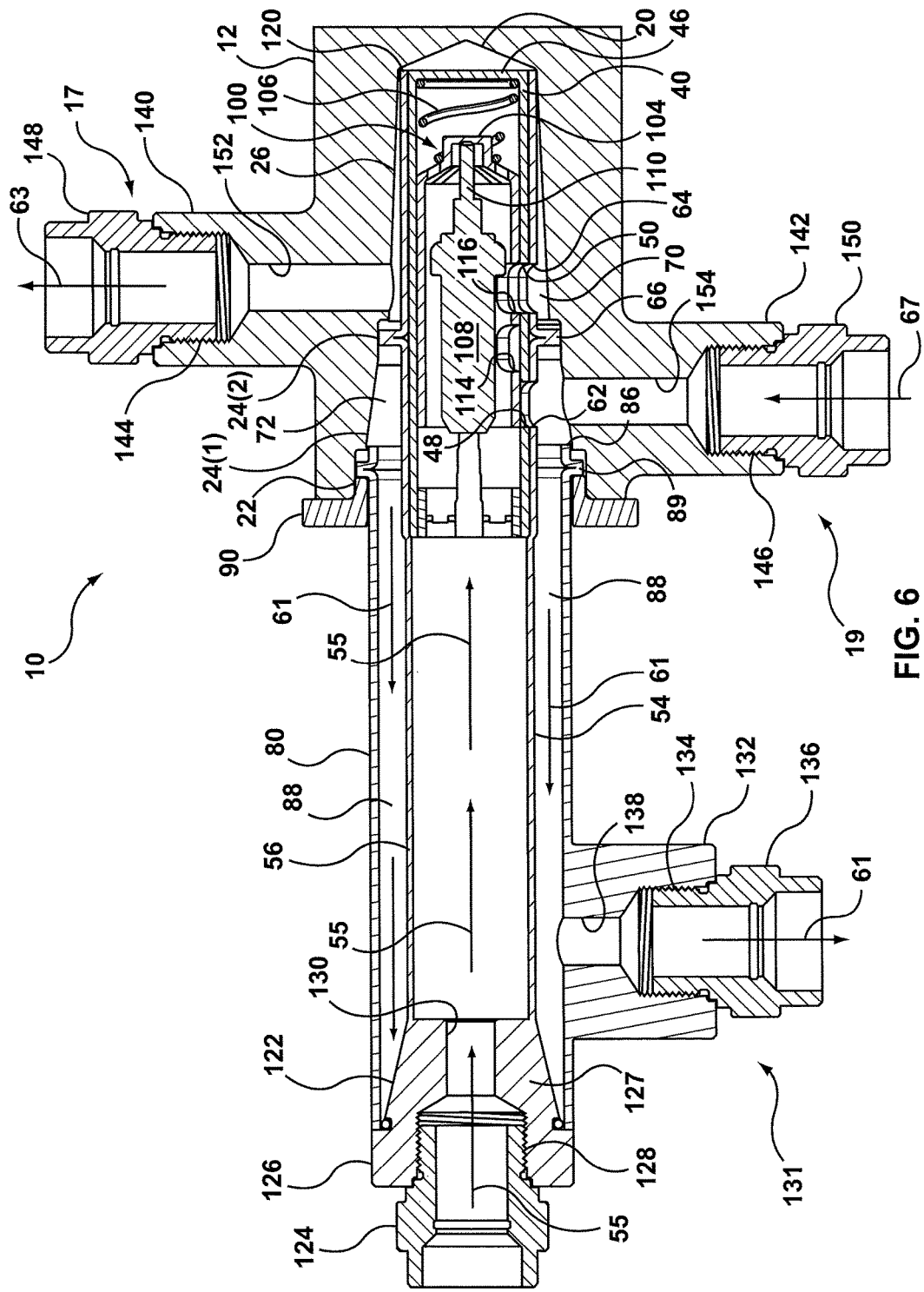
FIG. 6 is a cross-sectional view of the valve apparatus of FIG. 5 in a second operational state.

As the temperature of the fluid entering valve mechanism 100 increases to a second predetermined range, the valve mechanism 100 assumes its second position or second operational state illustrated in FIG. 6. As the actuator body 108 is activated by the thermal expansion of the material housed therein (or through electronic means in the case of an electronic valve), the piston 110 is pushed out of the actuator body and acts against the first end 104 of the outer housing 102. The action of the piston 110 against the outer housing 102 compresses the spring member as the outer housing 102 slides along the inner surface of the first sleeve member 40 bringing opening 116 into alignment with fluid openings 50, 64 formed in the first and second sleeve members 40, 54 thereby establishing fluid communication between the open interior space or first valve chamber 103 of the outer housing 102 and the third fluid chamber 70. As the second fluid outlet 17 is in fluid communication with the third fluid chamber 70, the fluid is directed from third fluid chamber 70 formed in the third region 26 of the main cavity through fluid outlet 17 to the inlet of the corresponding heat exchanger through any suitable fluid lines as illustrated schematically by directional flow arrow 63. Once the fluid has been cooled (or heated) by the corresponding heat exchanger 200 it is returned to the valve apparatus 10 through fluid inlet 19, as illustrated by directional flow arrow 67 and is returned to the fluid source through fluid chamber 72 and annular shaped flow passage 88, which serves as the first fluid outlet passage 15, with the fluid exiting the valve apparatus 10 through fluid outlet 131, as illustrated by directional flow arrows 61.

By having the valve apparatus 10 adapted for remote mounting to both the fluid source and the corresponding heat exchanger provides an added degree of flexibility when designing the overall automobile systems since the valve apparatus can be adapted and used in conjunction with various arrangements of the automobile components. Furthermore, the remotely mounted valve apparatus 10 may also be run as a stand-alone assembly in multiple platforms of the vehicle since it is not directly tied to the fluid source or the corresponding heat exchanger.

While various exemplary embodiments have been described, it will be understood that certain adaptations and modifications of the described embodiments can be made. Therefore, the above discussed embodiments are considered to be illustrative and not restrictive.

What is claimed is:

1. A valve apparatus comprising:
   a valve housing;
   a main cavity formed within said valve housing and extending from a first open end having a first diameter to a second closed end having a second reduced diameter, the second closed end being embedded within said valve housing;
   a first fluid inlet passage for receiving fluid from a fluid source in a first direction;
   a first fluid outlet passage for returning said fluid to said fluid source in a second direction that is generally opposite to said first direction;
   a second fluid outlet for discharging said fluid from said valve housing;
   a second fluid inlet for receiving said fluid discharged from said valve housing and returning said fluid to said fluid source via said first fluid outlet;
   a first valve chamber formed within said main cavity and in communication with said first fluid inlet;
   a valve mechanism slidingly mounted within said first valve chamber, the valve mechanism adapted for controlling fluid flow from said first fluid inlet passage to said second fluid outlet;
   a second valve chamber in fluid communication with first valve chamber and said first fluid outlet passage when said valve mechanism is in a first position;
   a third valve chamber in fluid communication with said first valve chamber and said second fluid outlet when said valve mechanism is in a second position;
   wherein said second valve chamber is fluidly isolated from said third valve chamber; and
   wherein the first fluid inlet passage is arranged coaxially within said first fluid outlet passage.

2. The valve apparatus as claimed in claim 1, wherein:
   a first sleeve member having an outer wall extending longitudinally between a first open end and closed second end is mounted within said main cavity of said valve housing, the outer wall of the first sleeve member defining an open interior space forming said first valve chamber; and
   wherein said valve mechanism is slidingly mounted within said first sleeve member.

3. The valve apparatus as claimed in claim 2, further comprising:
   a first fluid opening formed in said first sleeve member providing fluid communication between said first valve chamber and said second fluid chamber; and
   a second fluid opening formed in said second sleeve member providing fluid communication between said first valve chamber and said third fluid chamber;
   wherein said first and second fluid openings are in alignment with said second fluid inlet and said second fluid outlet, respectively.

4. The valve apparatus as claimed in claim 3, further comprising:
   a second sleeve member arranged exterior to and in contact with said first sleeve member, the first and second sleeve members together being mounted within the main cavity, said second sleeve member comprising:
   an outwardly extending peripheral flange for contacting and sealing against an inner surface of said main cavity, the outwardly extending peripheral flange forming a fluid barrier between and fluidly isolating said second fluid chamber from said third fluid chamber;
   a first fluid opening formed in said second sleeve member and aligned with said first fluid opening in said first sleeve member; and
   a second fluid opening formed in said second sleeve member and aligned with said second fluid opening in said first sleeve member;
   wherein said outwardly extending peripheral flange is positioned intermediate said first and second fluid openings; and
   a third sleeve member arranged co-axially around said second sleeve member, the third sleeve member having a first open end inserted within said first open end of said main cavity and forming an annular-shaped flow passage between said second sleeve member and said third member, the annular-shaped flow passage being in fluid communication with said second fluid chamber and serving as said first fluid outlet passage.

5. The valve apparatus as claimed in claim 4, wherein said valve mechanism comprises:

an outer housing in contact with and adapted for sliding movement along an inner surface of said first sleeve member;
an actuator body housed within said outer housing;
a piston coupled to said actuator body for moving said outer housing between said first position and said second position;
a first opening formed in said outer housing;
a second opening formed in said outer housing spaced apart from said first opening;
wherein said first opening is aligned with said first openings formed in said first and second sleeve members and said second fluid inlet of said valve housing when said piston is in said first position; and
wherein said second opening is aligned with said second fluid openings formed in said first and second sleeve members and said second fluid outlet of said valve housing when said piston is in said second position.

6. The valve apparatus as claimed in claim 5, wherein said second opening in said outer housing is sealed by said first sleeve member when said piston is in said first position.

7. The valve apparatus as claimed in claim 5, wherein said first opening in said outer housing is sealed by said first sleeve member when said piston is in said second position.

8. The valve apparatus as claimed in claim 5, wherein said valve mechanism further comprises a spring member having a first end coupled to said outer housing and a second free end in contact with said second end of said first sleeve member, the spring member providing a biasing force for returning said outer housing of said valve mechanism to said first position.

9. The valve apparatus as claimed in claim 4, wherein said second fluid outlet and said second fluid inlet are formed in said valve housing and adapted for direct connection with a corresponding inlet and a corresponding outlet on a corresponding heat exchanger; and
wherein said first fluid inlet passage and said first fluid outlet passage are adapted for remote connection to a corresponding outlet and a corresponding inlet of an automobile system component.

10. The valve apparatus as claimed in claim 9, wherein said second sleeve member comprises:
a generally tubular member having a first open end aligned with said second closed end of said first sleeve member and arranged proximal to said second closed end of said main cavity, and a second, opposed end in the form of a fluid coupling adapted for receiving a corresponding fluid fitting associated with the outlet of the automobile system component; and
wherein said third sleeve member comprises a generally tubular member extending between said first open end and a second open end, the second open end abutting and sealing against the second end of said second sleeve member thereby sealing said annular-shaped flow passage, the third sleeve member further comprising a laterally extending fluid outlet in fluid communication with said annular-shaped fluid passage.

11. The valve apparatus as claimed in claim 10, wherein said second end of said second sleeve member comprises:
a main body portion having a flanged exterior end, the main body portion extending away from the outer wall defining the generally tubular form of the second sleeve member to the flanged exterior end;
a cavity portion formed within the flanged exterior end for receiving the corresponding fluid fitting; and
a fluid passageway formed within the main body portion and extending from the cavity portion to the open interior space defined by the outer wall defining the generally tubular form of the second sleeve member, the open interior space being in fluid communication with said first valve chamber.

12. The valve apparatus as claimed in claim 11, wherein said second open end of said third sleeve member abuts and seals against the flanged exterior end.

13. The valve apparatus as claimed in claim 10, wherein said fluid outlet comprises:
a cylindrical projection extending laterally away from said tubular form of said third sleeve member;
a cavity portion formed in said cylindrical projection for receiving the corresponding fluid fitting;
a fluid passageway formed in said cylindrical projection and extending from said cavity portion to said annular-shaped fluid passage.

14. The valve apparatus as claimed in claim 13, wherein said cavity portion in said second end of said second sleeve member and said cavity portion in said fluid outlet in said third sleeve member are internally threaded for engaging with corresponding threads formed on the corresponding fluid fittings.

15. The valve apparatus as claimed in claim 13, wherein:
said second sleeve member comprises a generally tubular member having a first open end aligned with said second closed end of said first sleeve member and arranged proximal to said second closed end of said main cavity, and a second, opposed end in the form of a fluid coupling adapted for receiving a corresponding fluid fitting associated with the outlet of the automobile system component;
said third sleeve member comprises a generally tubular member extending between said first open end and a second open end, the second open end abutting and sealing against the second end of said second sleeve member thereby sealing said annular-shaped flow passage, the third sleeve member further comprising a laterally extending fluid outlet in fluid communication with said annular-shaped fluid passage;
said second fluid outlet in said valve housing is in the form of an integrally formed cylindrical projection extending away from said valve housing, the cylindrical projection having a cavity portion adapted for receiving a corresponding fluid fitting associated with the corresponding fluid inlet of the corresponding heat exchanger and a fluid passageway extending from said cavity portion to said third fluid chamber; and
said second fluid inlet in said valve housing is in the form of an integrally formed cylindrical projection extending away from said valve housing, the cylindrical projection having a cavity portion adapted for receiving a corresponding fluid fitting associated with the corresponding fluid outlet of the corresponding heat exchanger and a fluid passageway extending from said cavity portion to said second fluid chamber.

16. The valve apparatus as claimed in claim 15 wherein said cavity portion in said cylindrical projection forming the second fluid outlet and said cavity portion in said cylindrical projection forming said second fluid inlet are internally threaded for engaging with corresponding threads formed on the corresponding fluid fittings.

17. The valve apparatus as claimed in claim 4, wherein said first fluid inlet passage and said first fluid outlet passage are adapted for remote connection to a corresponding outlet and a corresponding inlet of an automobile system component; and wherein said second fluid outlet and said second fluid inlet are adapted for remote connection to a corresponding inlet and a corresponding outlet on a corresponding heat exchanger.

18. The valve apparatus as claimed in claim 1, wherein said first fluid inlet passage and said first fluid outlet passage are adapted for direct connection to an outer housing of a corresponding co-axial inlet and outlet openings on an automobile system component.

19. The valve apparatus as claimed in claim 18, wherein in said valve housing further comprises an outer mounting surface for mounting against the outer housing of the automobile system component.

20. A heat exchanger assembly, comprising:
 a heat exchanger comprising a plurality of stacked heat exchange plates defining alternating first and second fluid passageways, a pair of first manifolds in fluid communication with said first passageways and a pair of second manifolds in fluid communication with said second passageways; and
 a valve apparatus comprising:
  a valve housing having a main cavity formed therein and extending from a first open end having a first diameter to a second closed end having a second reduced diameter, the second closed end of said main cavity being embedded within said valve housing;
  a first fluid inlet passage for receiving fluid from a fluid source in a first direction;
  a first fluid outlet passage for returning said fluid to said fluid source in a second direction that is generally opposite to said first direction;
  a second fluid outlet for discharging said fluid from said valve housing to an inlet manifold of said heat exchanger;
  a second fluid inlet for receiving said fluid from an outlet manifold of said heat exchanger and returning said fluid to said fluid source via said first fluid outlet;
  a first valve chamber formed within said main cavity and in communication with said first fluid inlet;
  a valve mechanism slidingly mounted within said first valve chamber, the valve mechanism adapted for controlling fluid flow from said first fluid inlet passage to said second fluid outlet;
  a second valve chamber in fluid communication with first valve chamber and said first fluid outlet passage when said valve mechanism is in a first position;
  a third valve chamber in fluid communication with said first valve chamber and said second fluid outlet when said valve mechanism is in a second position;
  wherein said second valve chamber is fluidly isolated from said third valve chamber; and
  wherein the first fluid inlet passage is arranged coaxially within said first fluid outlet passage.

* * * * *